US012097440B2

(12) United States Patent
Fitoussi

(10) Patent No.: US 12,097,440 B2
(45) **Date of Patent: *Sep. 24, 2024**

(54) WHEEL GAME APPARATUS AND WAGERING GAME METHODS

(71) Applicant: Richar Fitoussi, Las Vegas, NV (US)

(72) Inventor: Richar Fitoussi, Las Vegas, NV (US)

( * ) Notice: Subject to any disclaimer, the term of this patent is extended or adjusted under 35 U.S.C. 154(b) by 742 days.

This patent is subject to a terminal disclaimer.

(21) Appl. No.: 17/146,840

(22) Filed: Jan. 12, 2021

(65) Prior Publication Data

US 2021/0252379 A1 Aug. 19, 2021

Related U.S. Application Data

(63) Continuation of application No. 16/120,609, filed on Sep. 4, 2018, now Pat. No. 10,888,768, which is a (Continued)

(51) Int. Cl.
*A63F 5/04* (2006.01)
*A63F 5/00* (2006.01)
*G07F 17/32* (2006.01)

(52) U.S. Cl.
CPC ............ *A63F 5/043* (2013.01); *A63F 5/0005* (2013.01); *A63F 5/0047* (2013.01); (Continued)

(58) Field of Classification Search
CPC ...... A63F 5/043; A63F 5/0005; A63F 5/0047; A63F 5/0076; A63F 5/0094
(Continued)

(56) References Cited

U.S. PATENT DOCUMENTS 1,474,488 A * 11/1923 Nelson ...................... A63F 5/02 273/142 F
2,095,367 A * 10/1937 Mattson .................... A63F 5/04 273/142 HA (Continued)

*Primary Examiner* — Joseph B Baldori
(74) *Attorney, Agent, or Firm* — Newman Law, LLC

(57) ABSTRACT

A roulette game apparatus for modifying a roulette wheel having a base with a central axial shaft and an inner roulette game ring mounted for rotational motion about the central axial shaft, the inner roulette game ring having an upper side, a lower side and a radially outer edge, the upper side of the inner roulette game ring including a plurality of circumferentially spaced roulette game pockets adjacent to the radially outer edge thereof, the roulette game apparatus comprising: a central cone mounted for rotational motion about the central axial shaft independently of the inner roulette game ring, the central cone including a marker thereon, the marker being disposed on the upper side of the central cone at a radially inner position relative to the radially outer edge of the central cone; and a plurality of raised portions protruding from the upper side of the central cone at a radially inner position relative to the radially outer edge of the central cone, wherein the marker on the upper side of the central cone is positioned in radial alignment with a single roulette pocket of the plurality of circumferentially spaced roulette game pockets on the inner roulette game ring responsive to the central cone coming to a rest subsequent to the central cone rotating about the central axial shaft.

12 Claims, 7 Drawing Sheets

Related U.S. Application Data continuation of application No. 15/093,735, filed on Apr. 8, 2016, now Pat. No. 10,065,106, which is a continuation of application No. PCT/US2016/026543, filed on Apr. 7, 2016.

(60) Provisional application No. 62/265,052, filed on Dec. 9, 2015, provisional application No. 62/144,307, filed on Apr. 7, 2015.

(52) U.S. Cl.
CPC .......... *A63F 5/0076* (2013.01); *A63F 5/0094* (2013.01); *G07F 17/3213* (2013.01); *G07F 17/329* (2013.01); *A63F 5/007* (2013.01)

(58) Field of Classification Search
USPC ...... 273/142 D, 142 E, 142 F, 142 G, 142 H, 273/142 HA, 142 JA, 142 JC, 142 JD
See application file for complete search history.

(56) References Cited

U.S. PATENT DOCUMENTS

| | | | | | |
|---|---|---|---|---|---|
| 3,853,324 | A * | 12/1974 | Reiner | A63F 5/00 | 273/142 E |
| 3,941,389 | A * | 3/1976 | Guimond | A63F 5/04 | 273/142 HA |
| 4,163,556 | A * | 8/1979 | Bertin | A63F 5/04 | 463/67 |
| 4,391,442 | A * | 7/1983 | Levy | A63F 9/0079 | 273/142 E |
| 5,102,135 | A * | 4/1992 | Addiechi | A63F 5/00 | 273/142 E |
| 5,636,838 | A * | 6/1997 | Caro | A63F 5/007 | 273/142 H |
| 6,047,965 | A * | 4/2000 | Mollo | A63F 5/00 | 273/142 D |
| 6,164,647 | A * | 12/2000 | Chee | A63F 5/00 | 273/142 F |
| 6,209,869 | B1 * | 4/2001 | Mathews | A63F 5/00 | 273/142 E |
| 6,217,022 | B1 * | 4/2001 | Astaneha | A63F 5/043 | 273/274 |
| 7,571,910 | B1 * | 8/2009 | Launzel | G07F 17/3258 | D21/375 |
| 7,674,172 | B2 * | 3/2010 | Miltenberger | A63F 5/007 | 273/142 E |
| 7,850,171 | B2 * | 12/2010 | Bontempo | G07F 17/3225 | 273/142 H |
| 8,348,277 | B2 * | 1/2013 | Fitoussi | A63F 5/007 | 273/142 E |
| 10,065,106 | B2 * | 9/2018 | Fitoussi | A63F 5/0047 | |
| 10,226,690 | B2 * | 3/2019 | Adams | A63F 5/007 | |
| 10,888,768 | B2 * | 1/2021 | Fitoussi | G07F 17/329 | |
| 2012/0175840 | A1 * | 7/2012 | Zerga | A63F 5/00 | 273/142 E |

* cited by examiner

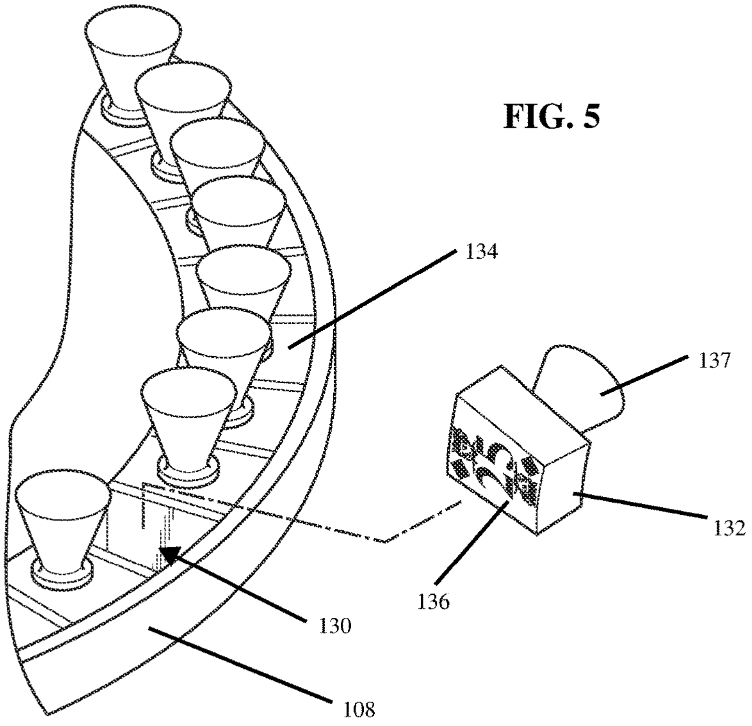
FIG. 5
FIG. 6
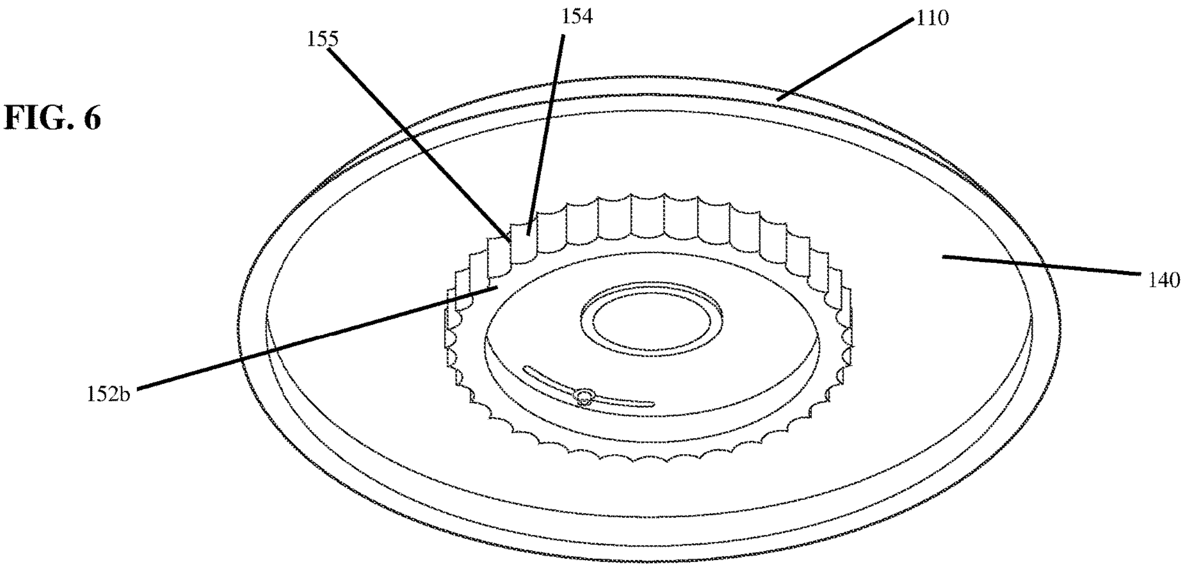

WHEEL GAME APPARATUS AND WAGERING GAME METHODS

CROSS-REFERENCE TO RELATED APPLICATIONS

This application is a continuation of U.S. Non-Provisional patent application Ser. No. 16/120,609 filed Sep. 4, 2019, now granted as U.S. Pat. No. 10,888,768, which is a continuation of U.S. Non-Provisional patent application Ser. No. 15/093,735 filed Apr. 8, 2016, now granted as U.S. Pat. No. 10,065,106, which claims priority to U.S. Provisional Patent Application No. 62/265,052 filed Dec. 9, 2015, and is a continuation of International Application No. PCT/US16/26543 filed Apr. 7, 2016, which claims priority to U.S. Provisional Patent Application No. 62/144,307 filed Apr. 7, 2015, the disclosures of which are incorporated herein by reference.

BACKGROUND OF THE INVENTION

The invention is directed to wagering games, and more particularly, wheel games typically found in gaming establishments, such as those involving a roulette wheel, playing surface, playing positions for multiple players, playing cards, and a dealer, or virtual representations thereof.

Casinos generally offer a variety of games. Some of these games incorporate or rely on apparatus for randomly determining an outcome, such as for example, games which rely on a wheel mounted for rotational motion. Wheel games include the games known as the Big Wheel and the Big Six but by far the most popular of the wheel games is roulette.

A typical roulette game consists of a table with betting layout adjacent to a roulette wheel rotor or ring mounted for rotational motion within a support structure. The ring includes a circular array of numbered segments bearing numbers 1 through 36 defined on its upper surface. American Roulette wheels typically have rings which also include the numbers 0 and 00 disposed at diametrically opposite locations on the upper surface, whereas European Roulette wheels include only the number 0. The numbers 1 through 36 are not disposed in numerical order, but rather are typically disposed in a predetermined arrangement, such that roulette wheels located in different casinos will have the same standard predetermined number ring arrangement. The numbers disposed in a circular array in the number ring region of the wheel bear the alternating colors of red and black, with the exception of the 0 and/or 00 numbers, which are typically colored green. A ring of pockets corresponding in number to the plurality of numbers of the ring lies adjacent but radially inward of the number ring on the typical roulette wheel. A typical roulette wheel further includes a central cone and a circular, inclined ball track radially outwardly of the ring.

In operation of a typical roulette game, players place chips or tokens on a betting layout located on a roulette table, and then the croupier or dealer spins the roulette wheel and the roulette ball is placed in motion along the circular ball track in the opposite direction of the rotation of the wheel. As the wheel slows, the ball moves radially inwardly and comes to rest in one of the pockets associated with a particular one of the numbers of the number ring. After the ball comes to rest in one of the pockets, the croupier or dealer settles the various wagers placed on the table layout in accordance with predetermined rules and wager odds and the process is repeated.

Roulette has remained basically unchanged since its inception in the 18th century. Despite the maturity of roulette, the game remains popular in casinos throughout the world. Nonetheless, there is always a need to add excitement to current casino games to increase their popularity with players and increase traffic and wagering at casinos.

SUMMARY OF THE INVENTION

The invention is generally directed to a system and method for providing a wheel game apparatus and related wagering game.

Some embodiment of the invention are directed to a roulette game apparatus for modifying a roulette wheel having a base with a central axial shaft and an inner roulette game ring mounted for rotational motion about the central axial shaft, the inner roulette game ring having an upper side, a lower side and a radially outer edge, the upper side of the inner roulette game ring including a plurality of circumferentially spaced roulette game pockets adjacent to the radially outer edge thereof, the roulette game apparatus comprising: a central cone mounted for rotational motion about the central axial shaft independently of the inner roulette game ring, the central cone being in an axial adjacent position relative to the upper side of the inner roulette game ring, the central cone having an upper side, a lower side and a radially outer edge, the upper side of the central cone including a marker thereon, the marker being disposed on the upper side of the central cone at a radially inner position relative to the radially outer edge of the central cone; and a plurality of raised portions protruding from the upper side of the central cone at a radially inner position relative to the radially outer edge of the central cone, the plurality of raised portions being spaced circumferentially apart from one another on the upper side of the central cone, wherein the marker on the upper side of the central cone is positioned in radial alignment with a single roulette pocket of the plurality of circumferentially spaced roulette game pockets on the inner roulette game ring responsive to the central cone coming to a rest subsequent to the central cone rotating about the central axial shaft.

In some embodiments, the aforementioned roulette game apparatus further comprises: a plunger mounted to the upper side of the inner roulette game ring, the plunger including a spring for biasing an arm extending radially inward, the arm including a distal end; and an annular ring mounted on the lower side of the central cone, the annular ring including a plurality of equally sized engagement spaces divided by radial ridges, the plurality of engagement spaces being equal to the number of circumferentially spaced roulette pockets on the inner roulette game ring, each engagement space being generally in radial alignment with a single circumferentially spaced roulette pocket on the inner roulette game ring, wherein the plunger is configured to form an engagement with at least one of the engagement spaces of the annular ring through the application of a radially inward force to the distal end of the arm of the plunger against the engagement space whereby the at least one marker is positioned in radial alignment with a single roulette pocket on the inner roulette game ring when the central cone is at rest.

In some embodiments, each of the engagement spaces comprises a radially inner recessed portion. In some embodiments, the distal end of the plunger includes a rotatable bearing.

Some embodiments of the invention are directed to a roulette game apparatus for modifying a roulette wheel having a base with a central axial shaft and an inner roulette game ring mounted for rotational motion about the central axial shaft, the inner roulette game ring having an upper side, a lower side and a radially outer edge, the upper side of the inner roulette game ring including a plurality of circumferentially spaced roulette game pockets adjacent to the radially outer edge thereof, the roulette game apparatus comprising: a central cone mounted for rotational motion about the shaft independently of the inner roulette game ring, the central cone being in an axial adjacent position relative to the upper side of the inner roulette game ring, the central cone having an upper side, a lower side and a radially outer edge, the upper side of the central cone including a marker thereon, the marker being disposed on the upper side of the central cone at a radially inner position relative to the radially outer edge of the central cone; a plurality of raised portions protruding from the upper side of the central cone at a radially inner position relative to the radially outer edge of the central cone, the plurality of raised portions being spaced circumferentially apart from one another on the upper side of the central cone, wherein the marker on the upper side of the central cone is positioned in radial alignment with a single roulette pocket of the plurality of circumferentially spaced roulette game pockets on the inner roulette game ring responsive to the central cone coming to a rest subsequent to the central cone rotating about the central axial shaft; a plunger mounted to the upper side of the inner roulette game ring, the plunger including a spring for biasing an arm extending radially inward, the arm including a distal end; and an annular ring mounted on the lower side of the central cone, the annular ring including a plurality of equally sized engagement spaces divided by radial ridges, the plurality of engagement spaces being equal to the number of circumferentially spaced roulette pockets on the inner roulette game ring, each engagement space being generally in radial alignment with a single circumferentially spaced roulette pocket on the inner roulette game ring, wherein the plunger is configured to form an engagement with at least one of the engagement spaces of the annular ring through the application of a radially inward force to the distal end of the arm of the plunger against the engagement space whereby the at least one marker is positioned in radial alignment with a single roulette pocket on the inner roulette game ring when the central cone is at rest.

In some embodiments, the upper side of the central cone includes a plurality of markers.

Some embodiments of the invention are also directed to a wheel game apparatus, such as a roulette wheel apparatus, which includes a central cone mounted for rotational motion on a stationary shaft independently of the radially outer number ring. The central cone further includes one or more circumferentially spaced markers, which may be positioned on a radially outer portion of the central cone. This embodiment further includes engagement members configured to form a non-permanent engagement permitting the central cone to rotate as a singular unit with the radially outer number ring, as in traditional roulette, and the central cone to rotate independently of the radially outer ring when disengaged.

Some embodiments of the invention are directed to a wheel game apparatus comprising a base having a central axial shaft; an inner ring mounted for rotational motion about the shaft, the inner ring having an upper side, a lower side and a radially outer edge, the upper side including a plurality of circumferentially spaced slots adjacent to the radially outer edge; a central cone mounted for rotational motion about the shaft in an axial adjacent position to the upper side of the inner ring, the central cone having an upper side, a lower side and a radially outer edge, the upper side including at least one marker thereon and a raised portion; a plunger mounted to the upper side of the inner ring, the plunger including a spring for biasing an arm extending radially inward, the arm including a distal end; and an annular ring mounted on the lower side of the central cone, the annular ring including a plurality of equally sized engagement spaces divided by radial ridges, the plurality of engagement spaces being equal to the number of circumferentially spaced slots, each engagement space being generally in radial alignment with a single circumferentially spaced slot, wherein the distal end of the arm of the plunger is configured to engage with the engagement spaces of the annular ring and align the at least one marker with a slot when the cone is not rotating as a result of force being applied to the raised portion.

In some embodiments, the wheel game apparatus further comprises: an outer ring mounted for rotational motion about the shaft, the outer ring having an upper side, a lower side and a radially outer edge, the upper side including a second marker thereon adjacent to the radially outer edge, wherein the outer ring is mounted axially adjacent to the lower side of the inner ring.

In some embodiments, the wheel game apparatus further comprises a second plunger mounted to the lower side of the inner ring, the second plunger including a spring for biasing an arm extending radially inward, the arm including a distal end; and a second annular ring mounted on the lower side of the inner ring, the second annular ring including a plurality of equally sized engagement spaces divided by radial ridges, the plurality of engagement spaces being equal to the number of circumferentially spaced slots, each engagement space being generally in radial alignment with a single circumferentially spaced slot, wherein the distal end of the arm of the second plunger is configured to engage with the engagement spaces of the second annular ring and align the second marker with a slot when the outer ring is not rotating.

In some embodiments, the wheel game apparatus further comprises a turret mounted on the axial shaft, the turret having a first portion and an second portion, the first portion and second portion being independently rotatable about the shaft, wherein the inner ring is connected for rotational motion with the first portion and the outer ring is connected for rotational motion with the second portion.

In some embodiments, the wheel game apparatus further comprises a plurality of substrates, each substrate being disposed in a slot, the substrate including an upper side and a lower side, the lower side including indicia thereon and the upper side including a member to facilitate removing the substrate from the slot.

Some embodiments of the invention are directed to a wheel game apparatus comprising: a base having a central axial shaft; an inner ring mounted for rotational motion about the shaft, the inner ring having an upper side, a lower side and a radially outer edge, the upper side including a plurality of circumferentially spaced slots adjacent to the radially outer edge; an outer ring mounted for rotational motion about the shaft, the outer ring having an upper side, a lower side and a radially outer edge, the upper side including a second marker thereon adjacent to the radially outer edge, wherein the outer ring is mounted axially adjacent to the lower side of the inner ring; a central cone mounted for rotational motion about the shaft in an axial adjacent position to the upper side of the inner ring, the central cone having an upper side, a lower side and a radially outer edge, the upper side including at least one marker thereon and a raised portion; a plunger mounted to the upper side of the inner ring, the plunger including a spring for biasing an arm extending radially inward, the arm including a distal end; an annular ring mounted on the lower side of the central cone, the annular ring including a plurality of equally sized engagement spaces divided by radial ridges, the plurality of engagement spaces being equal to the number of circumferentially spaced slots, each engagement space being generally in radial alignment with a single circumferentially spaced slot, wherein the distal end of the arm of the plunger is configured to engage with the engagement spaces of the annular ring and align the at least one marker with a slot when the cone is not rotating as a result of force being applied to the raised portion; a second plunger mounted to the lower side of the inner ring, the second plunger including a spring for biasing an arm extending radially inward, the arm including a distal end; and a second annular ring mounted on the lower side of the inner ring, the second annular ring including a plurality of equally sized engagement spaces divided by radial ridges, the plurality of engagement spaces being equal to the number of circumferentially spaced slots, each engagement space being generally in radial alignment with a single circumferentially spaced slot, wherein the distal end of the arm of the second plunger is configured to engage with the engagement spaces of the second annular ring and align the second marker with a slot when the outer ring is not rotating.

In some embodiments, the wheel game apparatus further comprises a turret mounted on the axial shaft, the turret having a first portion and an second portion, the first portion and second portion being independently rotatable about the shaft, wherein the inner ring is connected for rotational motion with the first portion and the outer ring is connected for rotational motion with the second portion.

In some embodiments, the wheel game apparatus further comprises a plurality of substrates, each substrate being disposed in a slot, the substrate including an upper side and a lower side, the lower side including indicia thereon and the upper side including a member to facilitate removing the substrate from the slot.

In some embodiments, the upper side of the cone includes a plurality of markers and raised portions.

In some embodiments, the distal end of the plunger includes a rotatable bearing.

Some embodiments of the invention are directed to a method of administering a wagering game over a communication network, comprising the steps of providing a computerized version of a wheel game apparatus as disclosed herein through a game server associated with a display device for displaying wheel game outcomes and a user interaction server for monitoring and administrating wagering thereon.

BRIEF DESCRIPTION OF THE DRAWINGS

FIG. 5 is a partial view of the exemplary wheel game apparatus of FIG. 2 illustrating among other things the substrate being removed from a slot;

FIG. 6 is a perspective view of the lower side of the cone of the wheel game apparatus of FIG. 2;

DETAILED DESCRIPTION OF THE INVENTION

In the following detailed description, reference is made to the accompanying drawings which form a part of this application. The drawings provide and illustrate specific exemplary embodiments in which the invention may be practiced. It is to be understood that other embodiments may be utilized and structural changes may be made without departing from the scope of the invention.

Figure 1:
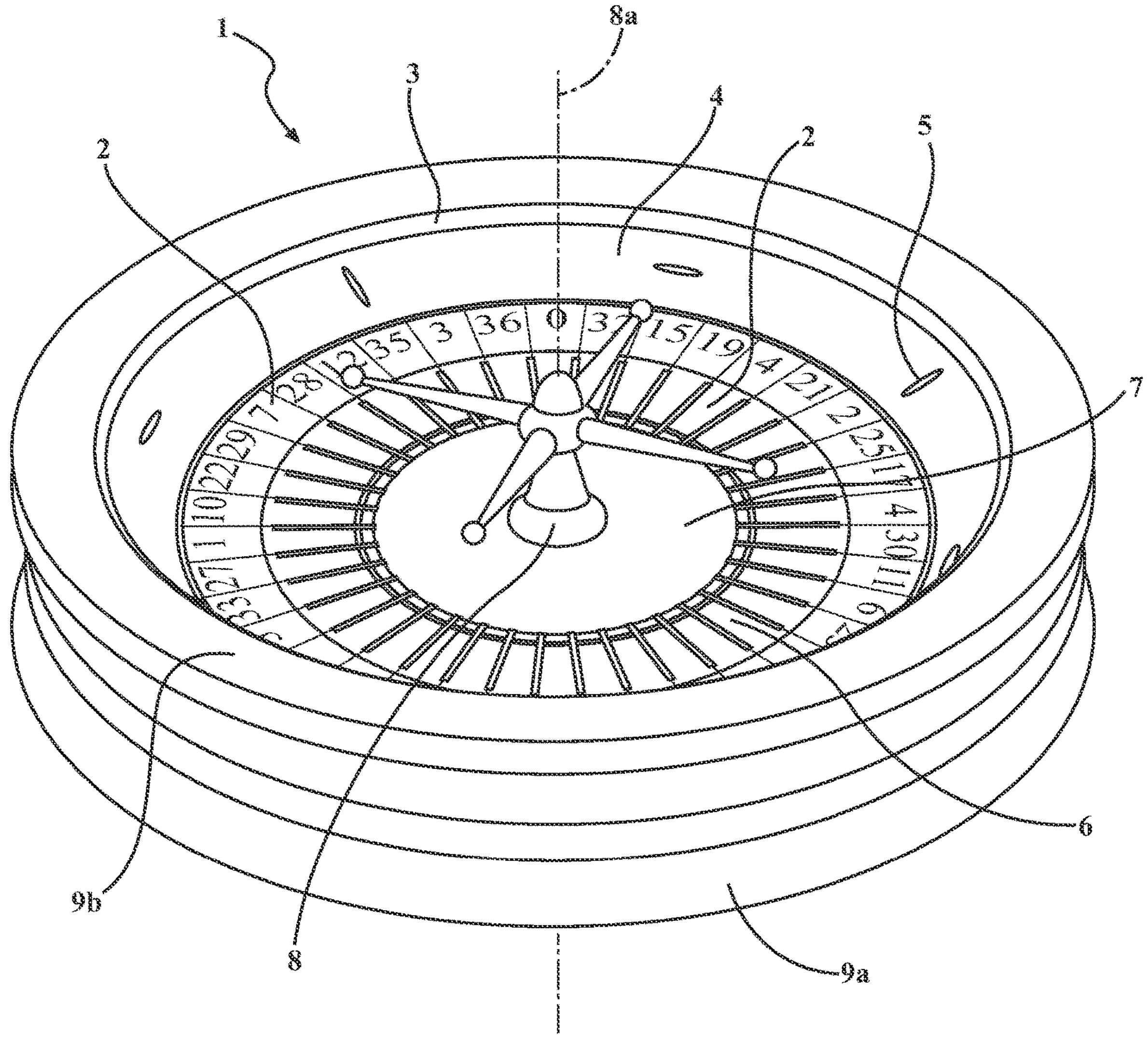
FIG. 1 is a perspective view of a conventional roulette wheel.
Figure 2:
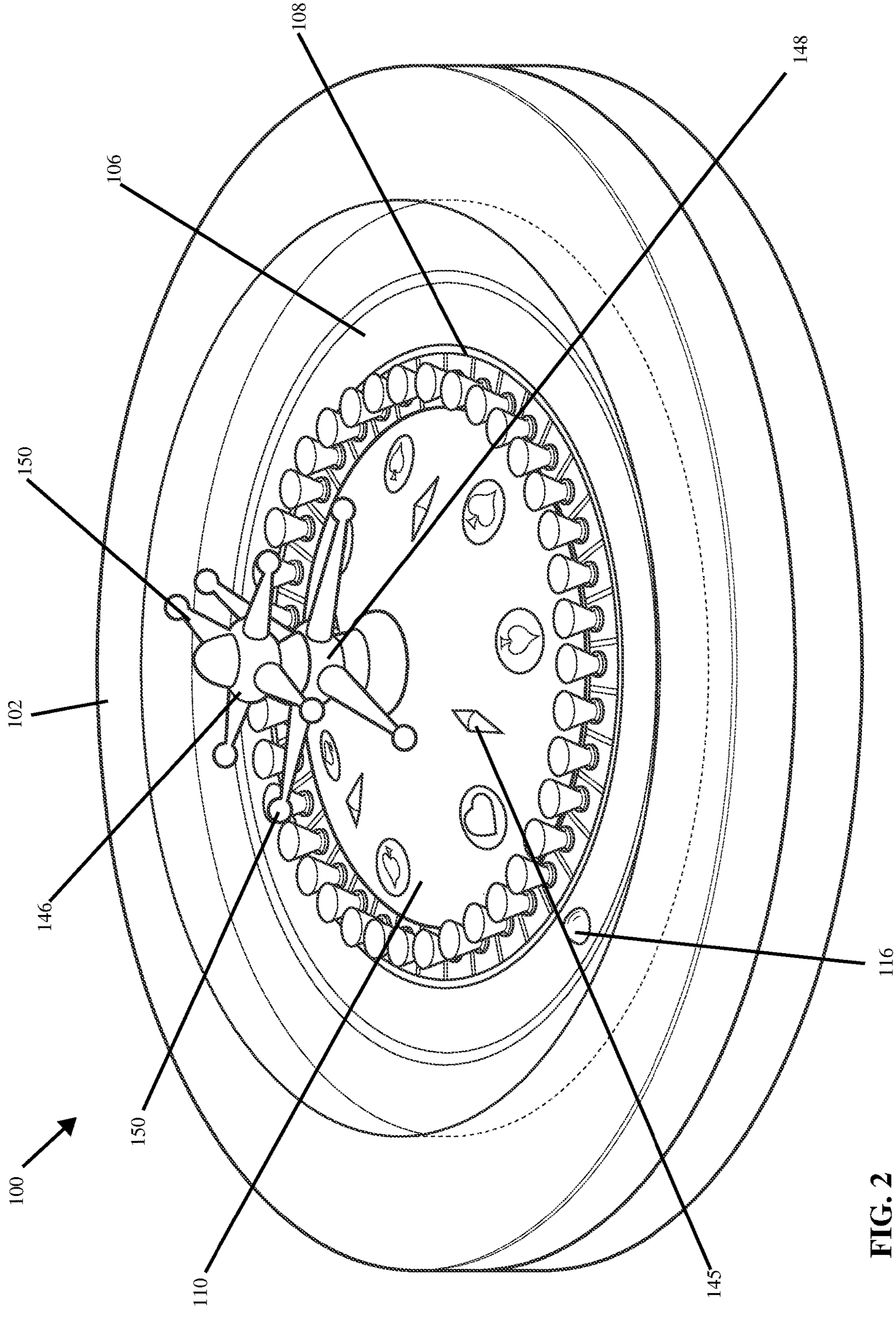
FIG. 2 is perspective view of an exemplary wheel game apparatus constructed in accordance with some embodiments of the invention.
Figure 3:
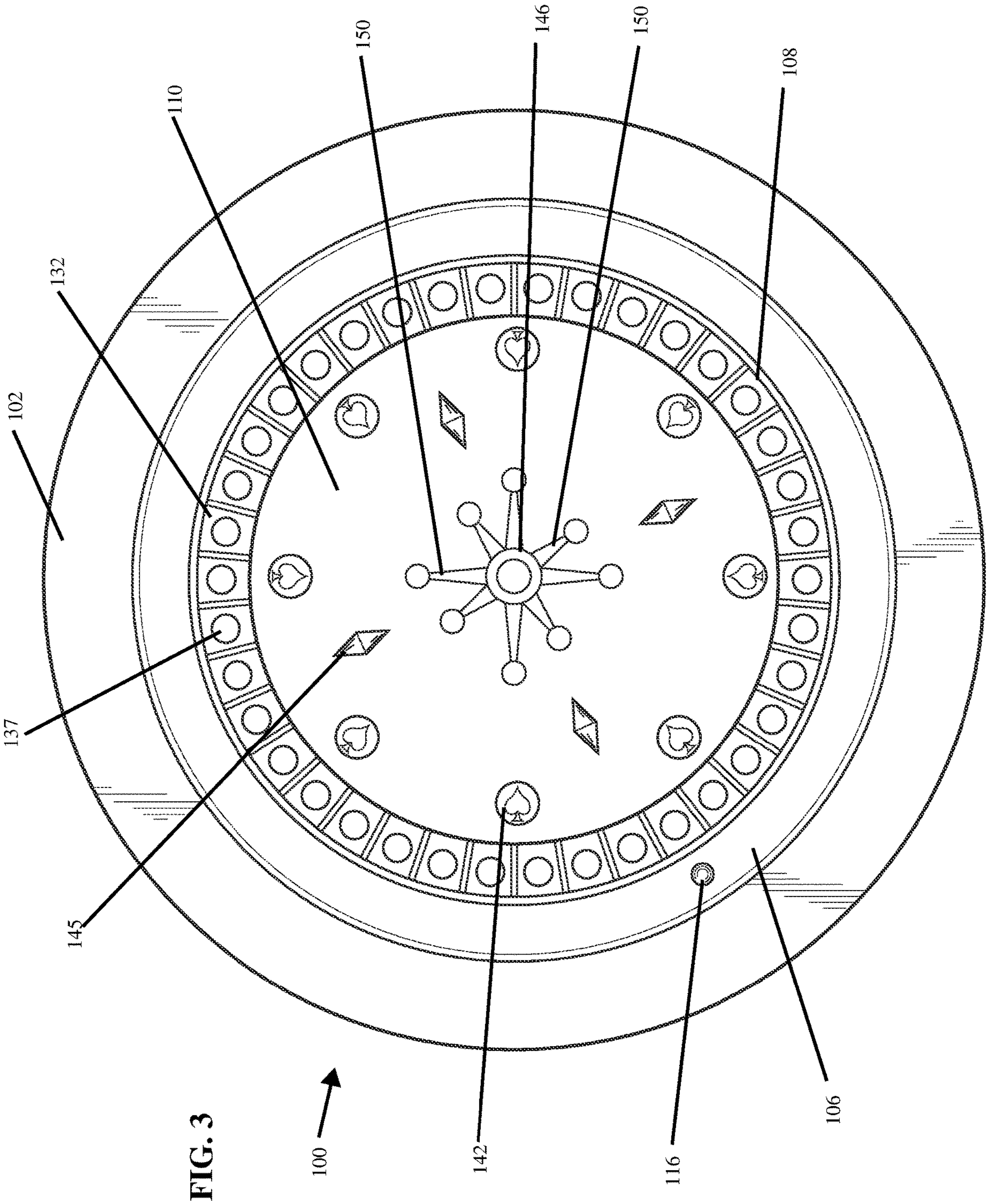
FIG. 3 is a top view of the exemplary wheel game apparatus of FIG. 2.
Figure 4:
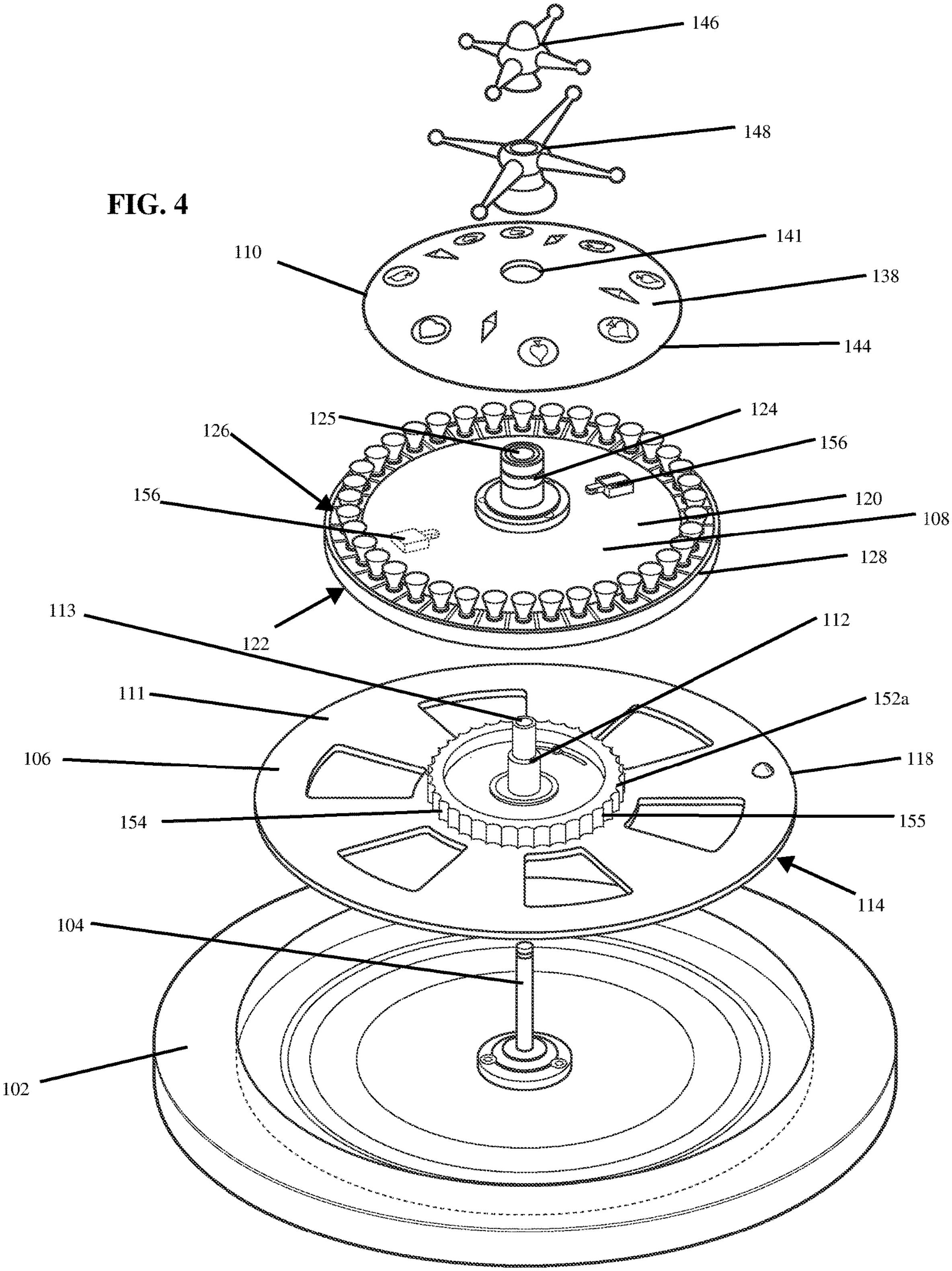
FIG. 4 is an exploded view of the exemplary wheel game apparatus of FIG. 2.
Figure 7:
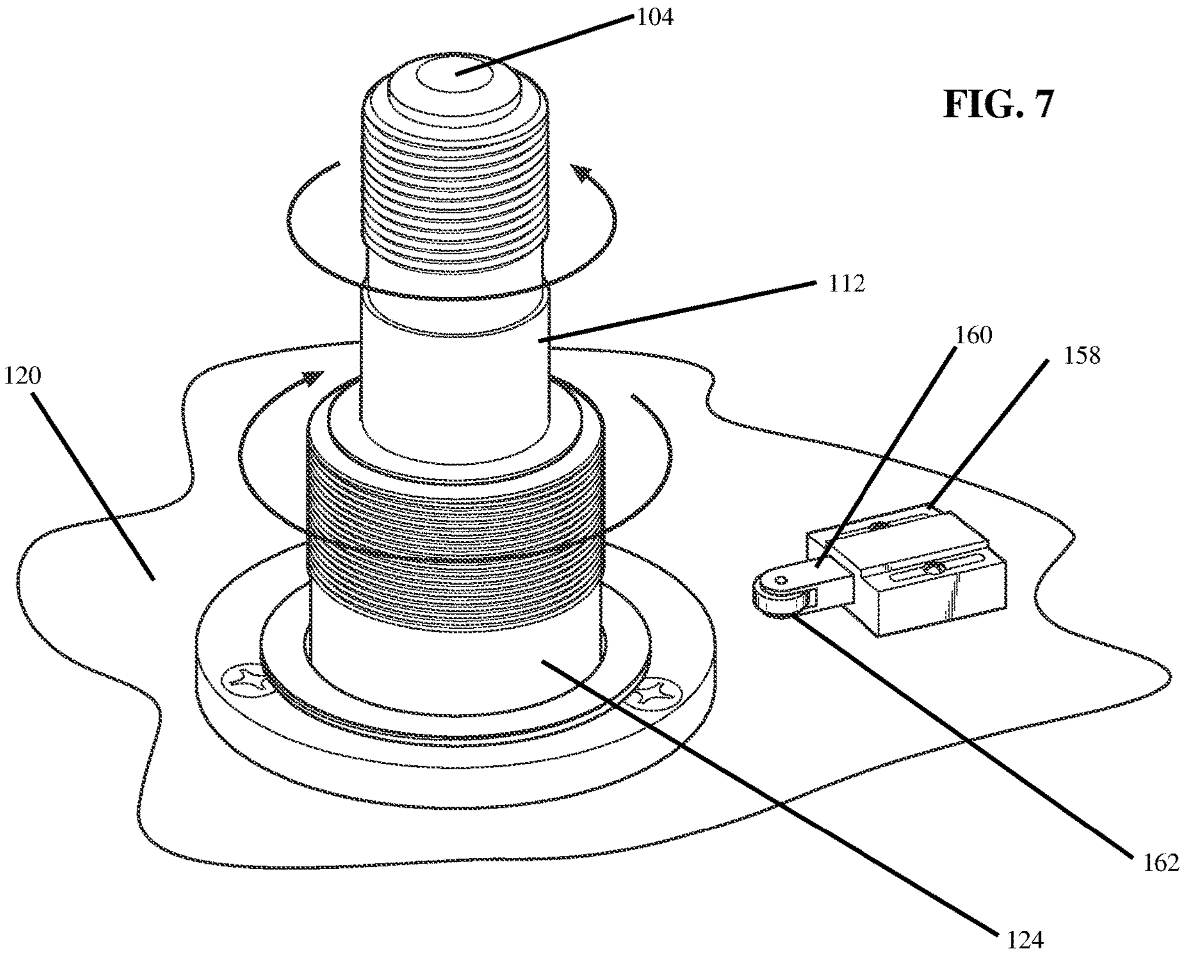
FIG. 7 is a view of the sleeve arrangement of an exemplary wheel game apparatus of FIG. 2.
Figure 8:
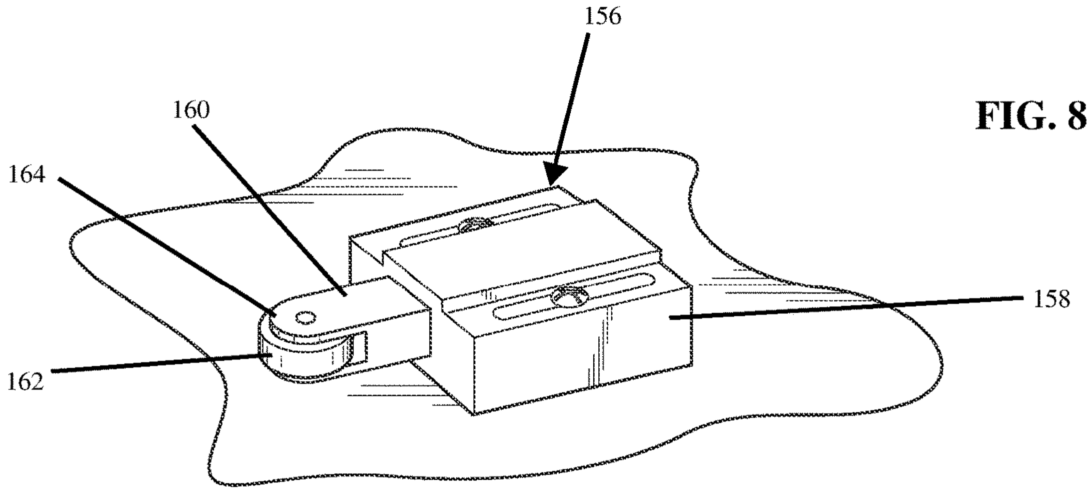
FIG. 8 is a closeup view of a plunger for use with an exemplary wheel game apparatus of FIG. 2.

FIG. 1 shows a conventional American style roulette wheel apparatus 1. To play roulette, the croupier first spins the wheel 2 in one direction and then spins a ball in upper ball track 3 in the opposite direction of the spinning wheel 2. Upper ball track 3 is slightly tilted toward the center, so that as the ball slows in the upper ball track 3, gravity will cause the ball to fall out onto the lower ball track 4. Rigidly mounted on the lower ball track are horizontal and vertical ball deflectors 5 designed to disrupt the smooth path of the ball and add a random variable to the path of the ball. As the ball continues to slow, gravity causes it to move toward the wheel 2. Wheel 2 includes thirty-eight circumferentially positioned pockets 6 formed by pocket dividers creating a space for a ball to fall therein. The ball may then fall into any pocket 6, hit a pocket divider and bounce either back onto lower ball track 4, onto cone 7 or into another pocket 6. Eventually a ball will fall into a pocket 6 and stay there. The winning number is the number associated with the pocket in which the ball finally comes to rest. In a conventional roulette wheel apparatus, turret 8 is a decorative element that covers internal parts relating to a central spindle (not shown) or shaft upon which wheel 2 is mounted at a central axis 8*a* extending longitudinally therethrough. Stationary bowl 9*a* has an upper annular rim 9*b* at a radially outer position relative to the central axis 8*a*.

FIGS. 2-9, a wheel game apparatus 100, having a bowl 102 and shaft 104 upon and about which each of an outer ring 106, an inner ring 108 and a cone 110, are mounted for rotational motion.

Outer ring 106 includes an upper side 111 and a lower side 114. Upper side 111 includes an axially extending central sleeve coupling member 112 defining a central receiving port 113 and a marker 116 positioned adjacent to the radially outer edge 118 of outer ring 106, which may extend axially. Marker 116 may be in a variety of shapes, such as wholly or partially spherical (as shown herein), or in the form of an arrow.

Inner ring 108 includes an upper side 120 and lower side 122, and an axially extending central sleeve coupling member 124 defining a central receiving port 125 and with a ring of circumferentially spaced slots 126 positioned adjacent to the radially outer edge 128 of inner ring 108. Each slot 130 includes a substrate 132 configured to be inserted therein. Each substrate 132 includes an upper side 134 having a handle or pull 137 extending generally axially therefrom and a lower side 136. Lower side 136 may include indicia, such as shown particularly in FIG. 4, which may be disposed on substrate 132 or upon a layer of material adhered to lower side 136 of substrate 132.

Cone 110 includes an upper side 138 and lower side 140 with a central receiving port 141 extending axially therethrough. Upper side 138 include one or more indicia or markers 142 disposed circumferentially spaced apart from one another thereon at a radially position adjacent to the outer edge 144 of cone 110 and one or more raised portions 145. Markers 142 may include any symbols or shapes, such as the card suits shown herein.

When assembled, outer ring 106 is seated in bowl 102 with shaft 104 extending axially through receiving port 113 of sleeve coupling member 112. Inner ring 108 is seated in bowl 102 with sleeve coupling member 112 of ring 106 and shaft 104 extending axially through receiving port 125 of sleeve coupling member 124 and lower side 122 of ring 108 adjacent to upper side 111 of outer ring 112. Cone 108 is seated in bowl 102 with sleeves 112, 124 and shaft 104 extending axially through receiving port 141. The exposed portion of sleeve 112 is then secured to an upper turret 146 and the exposed portion of sleeve 124 is secured with a lower turret 148, independently of one another. Upper and lower turrets 146 and 148 may include receiving ports therein for receiving sleeves 112 and 124 therein and finials 150. Upper turret 146 and lower turret 148 and sleeves 112 and 124 may respectively include corresponding threading for this purpose.

Outer ring 106 and/or inner ring 108 further include features configured to form an aligned and non-permanent engagement between outer ring 106 and inner ring 108. These aligning and engagement features are configured to be disengaged upon the application of sufficient yet non-strenuous rotational force to outer ring 106 and/or inner ring 108 (such as for example, the magnitude of force applied by a croupier to cause the rotation of wheel 2), thus allowing rings 106 and 108 to be spun and rotate independently of one another as the features that form the engagement remain unable to engage due to the angular velocity of the outer ring 106 and inner ring 108. The features are further configured to engage upon at a decreased rate of angular velocity, such as an appropriate velocity prior to rings 106 and 108 coming to rest, in a position relative to one another such that upon the features being engaged, the marker 116 is in radial alignment with a single slot 130 of the ring of spaced slots 126. Inner ring 108 and/or cone 110 further include similar features configured to form an aligned and non-permanent engagement with one another, by which independent rotational motion of cone 110 and inner ring 108 is permitted when disengaged Upon inner ring 108 and cone 110 being engaged, each of the markers 142 are in radial alignment with a single slot 130 of the ring of spaced slots 126.

Applicant incorporates herein by reference for all purposes U.S. Pat. Nos. 5,636,838 and 8,348,277, owned by applicant hereto, and in particular for providing examples of aligning and engagement features which may be used with the embodiment shown and other embodiments of the invention.

In this embodiment, the features for aligning and forming the non-permanent engagement include a first annular ring 152*a* and a second annular ring 152*b*, each having peripheral grooves 154 defining a plurality of radial spaces or recesses and radial ridges 155, and a spring-biased plunger 156 having a housing 158 with an arm 160. Grooves 154 may correspond in circumferential position and number with ring of slots 126. Arm 160 is connected to a spring or similar biasing member within housing 158 at a proximal end thereof and includes a freely rolling bearing 162 mounted thereon at a distal end 164. A first plunger housing 158 is secured to the upper side 120 of inner ring 108 and a second plunger housing 158 is secured of lower side 122 of inner ring 108 with each respective arm 160 extending radially inward toward receiving port 125. A first annular ring 152*a* is secured to the upper side 111 of outer ring 106 and a second annular ring 152*b* is secured to the lower side 140 of cone 110. Each annular ring 152*a* and 152*b* and its respective plunger 156 are configured and positioned to cooperate such that bearing 162 contacts and spins along grooves 154 as ring 106, ring 108 and cone 110 are rotated. In some embodiments, cone 110 or ring 108 includes the aligning and engaging mechanism as disclosed in U.S. Pat. No. 5,636,838 which includes a ring having a plurality of axial pins and a spring-biased plunger with a feeler at a distal end instead of a bearing 162.

In this embodiment, spring-loaded plunger 156 sufficiently biased to keep cone 110 from being disengaged for rotational motion unless force to cause such rotational motion is applied to one or more of the raised portions 145. Thus, cone 110 will remain engaged with inner ring 108 and spin with inner ring 108 when inner ring 108 is rotated, rather than rotate independently of inner 108.

Figure 9:
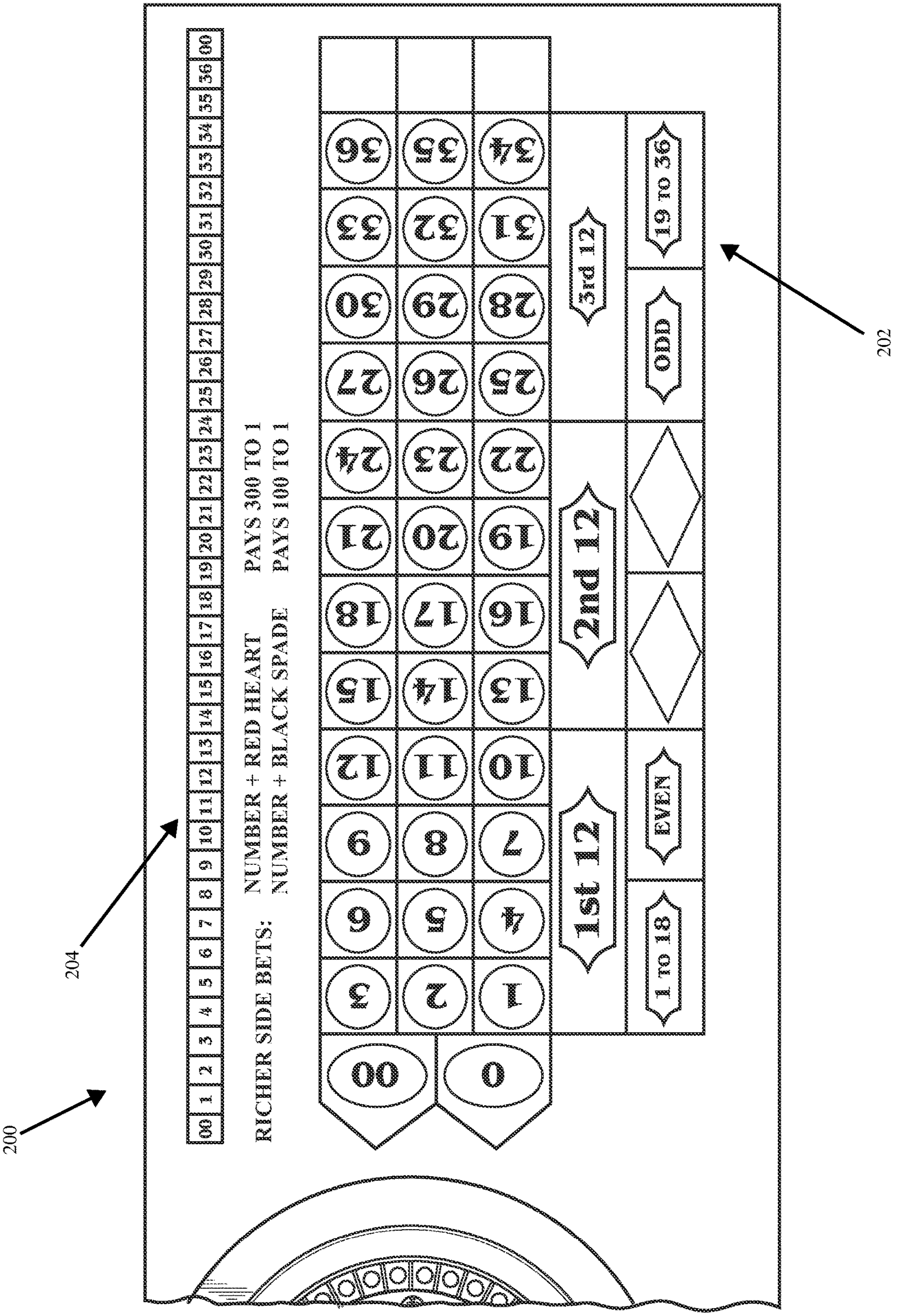
FIG. 9 is an exemplary layout illustrating a method of playing a wagering game using the wheel game apparatus of FIG. 2.

In some embodiments, a player may place a wager on a layout 200 of FIG. 9, which may be a physical table or an electronic or virtual version thereof displayed on a terminal display device. Layout 200 includes traditional roulette-type wagers in area 202 and "Richer side bets" in area 204. The wheel device 100 may then be operated by first applying force to a raised portion 145 to disengage and spin cone 110 from its engagement with inner ring 108 and then allowing cone 110 to deaccelerate and engage with inner ring 108. The engagement of cone 110 will result in each marker 142 coming into alignment with a slot 130, which, as a result of the rotation of the cone 110, may be different from the prior alignment of each marker 142 and slot 130. Inner ring 108 will then be rotated which can be facilitated by gripping and applying force to finials 150 of lower turret 148. Outer ring 106 will then be rotated, preferably in the opposing direction to the rotation of inner ring 108, by gripping and applying force to finials 150 of upper turret 146. Inner ring 108 and outer ring 106 will deaccelerate and eventually reach a velocity at which ring 108 will form an engagement with ring 106, that is, there will not be sufficient force to cause bearing 162 to move bearing 162 around a radial ridge 155 into an adjacent groove 154, but rather, bearing 162 will instead remain within a particular groove 154. Marker 116 will be in alignment with a slot 130 as a result of the engagement of ring 108 and ring 106, thus identifying the slot 130. The substrate 132 within the identified slot 126 will be pulled from the slot by the pull 136 and the lower side 136 with indicia thereon will be revealed. For example, if the indicia on the lower side 136 includes the number "25" as shown in FIG. 5, then wagers on the number 25 in FIG. 9 will be resolved as winning wagers. In this embodiment, each substrate 132 includes a single one of the numbers shown in areas 202 and 204. However, it should be understood that other indicia may be used. For example, indicia may include traditional roulette numbers found on an American or European Roulette wheel or playing card values. If a marker on cone 110 is also in alignment with the identified slot then wagers placed in side wager area 204 on the number "25" will also be resolved as winning wagers. Markers 142 on cone 110 may include similar or different symbols, thus enabling varying odds of winning. In this embodiment, markers 142 may include two red hearts and six spades which corresponds with different odds payouts.

In some embodiments, a cone 110 and engagement with an inner ring 308 of conventional roulette design, that is, without substrates 132, is retrofitted in a conventional roulette wheel, or otherwise constructed and included in a modified roulette wheel, thus creating a new side wager opportunity for conventional roulette as shown by area 204 in addition to the conventional roulette game.

Those skilled in the art will readily appreciate that any of the systems and methods of the invention may be constructed of any suitable materials.

It should be understood that any of the aforementioned embodiments of the invention may be incorporated in a fully or partially automated or interactive, computerized platform supporting multiple player positions and wagering and/or provided online. The apparatus may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as a mobile device. Those skilled in the art will further appreciate that the precise types of software and hardware used are not vital to the full implementation of the methods of the invention.

It should be readily apparent that additional computerized or manual systems may also be employed in accordance with the invention in order to achieve its full implementation as a system, apparatus or method.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and equivalents thereto.

The invention claimed is:

1. A roulette game modification apparatus configured to modify a roulette wheel into a wheel game, the roulette wheel having a base with a central axial shaft and an inner roulette game ring mounted for rotational motion about the central axial shaft, the inner roulette game ring having an upper side, a lower side and a radially outer edge, the upper side of the inner roulette game ring including a plurality of circumferentially spaced roulette game pockets adjacent to the radially outer edge thereof, each roulette game pocket of the plurality of spaced roulette game pockets defining a pocket bottom surface, the roulette game modification apparatus comprising:

an outer ring mounted for rotational motion about the shaft, the outer ring having an upper side, a lower side and a radially outer edge, the upper side including a marker thereon adjacent to the radially outer edge, wherein the outer ring is configured to rotate independently from the inner ring; and a plurality of substrates, each substrate of the plurality of substrates including a lower portion and an upper portion, the lower portion being seated adjacent the pocket bottom surface in a roulette game pocket of the plurality of circumferentially spaced roulette game pockets, wherein the lower portion including a surface with an indicia thereon, the upper portion including a lower side and an upper side, wherein an elongated member is affixed to the upper side, the elongated member protruding from the upper side to facilitate the movement of the upper portion between a first condition wherein the indicia on the surface of the lower portion is covered and a second condition wherein the indicia on the surface of the lower portion is uncovered.

2. The roulette game modification apparatus of claim 1, further comprising:

a plunger mounted to the upper side of the inner roulette game ring, the plunger including a spring for biasing an arm extending radially inward, the arm including a distal end;

a central cone mounted for rotational motion about the shaft independently of the inner roulette game ring, the central cone being in an axial adjacent position relative to the upper side of the inner roulette game ring, the central cone having an upper side, a lower side and a radially outer edge, the upper side of the central cone including a second marker thereon, the second marker being disposed on the upper side of the central cone at a radially inner position relative to the radially outer edge of the central cone; and an annular ring mounted on the lower side of the central cone, the annular ring including a plurality of equally sized engagement spaces divided by radial ridges, the plurality of engagement spaces being equal to the number of circumferentially spaced roulette pockets on the inner roulette game ring, each engagement space being generally in radial alignment with a single circumferentially spaced roulette pocket on the inner roulette game ring, wherein the plunger is configured to form an engagement with at least one of the engagement spaces of the annular ring through the application of a radially inward force to the distal end of the arm of the plunger against the engagement space whereby the at least one marker is positioned in radial alignment with a single roulette pocket on the inner roulette game ring when the central cone is at rest.

3. The roulette game modification apparatus of claim 2, wherein each of the engagement spaces comprises a radially inner recessed portion.

4. The roulette game modification apparatus of claim 2, wherein the distal end of the plunger includes a rotatable bearing.

5. The roulette game modification apparatus of claim 2, further comprising a turret mounted for rotational motion on the central axial shaft, the turret having a collar being independently rotatable about the shaft, wherein the central cone is connected for rotational motion with the collar.

6. A roulette game modification apparatus, comprising:

a roulette wheel having a base with a central axial shaft;

an inner roulette game ring mounted for rotational motion about the central axial shaft, the inner roulette game ring having an upper side, a lower side and a radially outer edge, the upper side of the inner roulette game ring including a plurality of circumferentially spaced roulette game pockets adjacent to the radially outer edge thereof, each roulette game pocket of the plurality of spaced roulette game pockets defining a pocket bottom surface;

an outer ring mounted for rotational motion about the shaft, the outer ring having an upper side, a lower side and a radially outer edge, the upper side including a marker thereon adjacent to the radially outer edge, wherein the outer ring is configured to rotate independently from the inner ring; and a plurality of substrates, each substrate of the plurality of substrates including a lower portion and an upper portion, the lower portion being seated adjacent the pocket bottom surface in a roulette game pocket of the plurality of circumferentially spaced roulette game pockets, wherein the lower portion including a surface with an indicia thereon, the upper portion including a lower side and an upper side, wherein an elongated member is affixed to the upper side, the elongated member protruding from the upper side to facilitate the movement of the upper portion between a first condition wherein the indicia on the surface of the lower portion is covered and a second condition wherein the indicia on the surface of the lower portion is uncovered.

7. The roulette game modification apparatus of claim 6, further comprising:

a plunger mounted to the upper side of the inner roulette game ring, the plunger including a spring for biasing an arm extending radially inward, the arm including a distal end;

a central cone mounted for rotational motion about the shaft independently of the inner roulette game ring, the central cone being in an axial adjacent position relative to the upper side of the inner roulette game ring, the central cone having an upper side, a lower side and a radially outer edge, the upper side of the central cone including a second marker thereon, the second marker being disposed on the upper side of the central cone at a radially inner position relative to the radially outer edge of the central cone; and an annular ring mounted on the lower side of the central cone, the annular ring including a plurality of equally sized engagement spaces divided by radial ridges, the plurality of engagement spaces being equal to the number of circumferentially spaced roulette pockets on the inner roulette game ring, each engagement space being generally in radial alignment with a single circumferentially spaced roulette pocket on the inner roulette game ring, wherein the plunger is configured to form an engagement with at least one of the engagement spaces of the annular ring through the application of a radially inward force to the distal end of the arm of the plunger against the engagement space whereby the at least one marker is positioned in radial alignment with a single roulette pocket on the inner roulette game ring when the central cone is at rest.

8. The roulette game modification apparatus of claim 7, wherein each of the engagement spaces comprises a radially inner recessed portion.

9. The roulette game modification apparatus of claim 7, wherein the distal end of the plunger includes a rotatable bearing.

10. The roulette game modification apparatus of claim 6, further comprising:

a plunger mounted to the lower side of the inner roulette game ring, the plunger including a spring for biasing an arm extending radially inward, the arm including a distal end; and an annular ring mounted on the lower side of the inner roulette game ring, the annular ring including a plurality of equally sized engagement spaces divided by radial ridges, the plurality of engagement spaces being equal to the number of circumferentially spaced roulette game pockets, each engagement space being generally in radial alignment with a single circumferentially spaced roulette game pockets, wherein the distal end of the arm of the plunger is configured to engage with the engagement spaces of the annular ring.

11. The roulette game modification apparatus of claim 10, wherein each of the engagement spaces comprises a radially inner recessed portion.

12. The roulette game modification apparatus of claim 10, wherein the distal end of the plunger includes a rotatable bearing.

* * * * *